United States Patent [19]
Moisin

[11] Patent Number: 6,160,358
[45] Date of Patent: Dec. 12, 2000

[54] BALLAST CIRCUIT WITH LAMP CURRENT REGULATING CIRCUIT

[75] Inventor: Mihail S. Moisin, Brookline, Mass.

[73] Assignee: Electro-Mag International, Inc., N. Scituate, Mass.

[21] Appl. No.: 09/173,951

[22] Filed: Oct. 16, 1998

Related U.S. Application Data

[63] Continuation-in-part of application No. 09/146,859, Sep. 3, 1998.

[51] Int. Cl.[7] ............................................... G05F 1/00
[52] U.S. Cl. ..................... 315/291; 315/224; 315/209 R; 315/308
[58] Field of Search ................................ 315/209 R, 224, 315/209 CD, 307, 291, 276, 308, DIG. 5, 219, 297

[56] References Cited

U.S. PATENT DOCUMENTS

| | | | |
|---|---|---|---|
| 3,808,481 | 4/1974 | Rippel | 318/139 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 363/28 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 R |
| 4,608,958 | 9/1986 | Sakakibara et al. | 123/605 |
| 4,618,810 | 10/1986 | Hagerman et al. | 318/803 |

(List continued on next page.)

FOREIGN PATENT DOCUMENTS

| | | |
|---|---|---|
| 0460641 | 12/1991 | European Pat. Off. . |
| 0522266 | 1/1993 | European Pat. Off. . |
| 0 642 295 | 3/1995 | European Pat. Off. ........ H05B 41/29 |
| 4010435 | 10/1991 | Germany . |
| 4032664 | 4/1992 | Germany . |
| 63-002464 | 11/1988 | Japan ............................... H02H 9/08 |
| 2204455 | 11/1988 | United Kingdom . |
| 9422209 | 9/1994 | WIPO . |
| WO 94 22209 | 9/1994 | WIPO ............................ H02M 5/00 |
| 9535646 | 12/1995 | WIPO . |

OTHER PUBLICATIONS

Kazimierczuk, Marian et al. "*Resonant Power Converters*", (1995), A Wiley–Interscience Publication, pp. 332–333.

"Simple Dimming Circuit for Fluorescent Lamp", IBM Technical Disclosure Bulletin, vol. 34, No. 4A, Sep. 1, 1991, pp. 109–111, XP000210848.

Blanco, C. et al. "A Single Stage Fluorescent Lamp Ballast With High Power Factor", Annual Applies Power Electronics Conference and Expositions (APEC), US, New York, IEEE, vol. Conf. 11, p. 616–621.

*Primary Examiner*—Don Wong
*Assistant Examiner*—Wilson Lee
*Attorney, Agent, or Firm*—Nutter, McClennen & Fish, LLP

[57] ABSTRACT

A ballast circuit for energizing a lamp includes an inverter circuit having a switching element with a conduction state controlled by a control circuit which limits a voltage applied to the lamp. In one embodiment, the control circuit includes an integrated circuit providing a conduction control signal to a duty cycle control circuit. The conduction control signal alternately biases the switching element to conductive and non-conductive states at a first duty cycle when the lamp voltage is below a predetermined level. When the lamp voltage becomes greater than the predetermined level, the duty cycle control circuit decreases the switching element to a second duty cycle, which is less than the first duty cycle, to reduce the voltage at the lamp. In one embodiment, the ballast regulates the lamp current to a predetermined level such that the ballast can energize a lamp which can vary in length and has a predetermined diameter. In another embodiment, the integrated circuit provides the conduction control signal to a plurality of duty cycle control circuits forming a portion of further inverters for independently energizing multiple lamps. In a further embodiment, a modular ballast for energizing a plurality of lamps includes a plurality of replaceable modules.

31 Claims, 11 Drawing Sheets

U.S. PATENT DOCUMENTS

| | | | |
|---|---|---|---|
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/103 |
| 5,052,039 | 9/1991 | Moisin | 379/402 |
| 5,063,339 | 11/1991 | Orii et al. | 318/696 |
| 5,081,401 | 1/1992 | Moisin | 315/324 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 R |
| 5,138,236 | 8/1992 | Bobel et al. | 315/209 R |
| 5,144,195 | 9/1992 | Konopka et al. | 315/94 |
| 5,148,087 | 9/1992 | Moisin et al. | 315/291 |
| 5,173,643 | 12/1992 | Sullivan et al. | 315/276 |
| 5,177,408 | 1/1993 | Marques | 315/291 |
| 5,191,263 | 3/1993 | Konopka | 315/209 R |
| 5,216,332 | 6/1993 | Nilssen | 315/224 |
| 5,220,247 | 6/1993 | Moisin | 315/209 R |
| 5,223,767 | 6/1993 | Kulka | 315/209 R |
| 5,256,939 | 10/1993 | Nilssen | 315/244 |
| 5,291,382 | 3/1994 | Cohen | 363/16 |
| 5,309,066 | 5/1994 | Ditlevsen | 315/205 |
| 5,313,143 | 5/1994 | Vila-Masot et al. | 315/209 R |
| 5,315,533 | 5/1994 | Stich et al. | 364/480 |
| 5,332,951 | 7/1994 | Turner et al. | 315/209 R |
| 5,334,912 | 8/1994 | Counts | 315/119 |
| 5,390,231 | 2/1995 | Hung et al. | 379/2 |
| 5,399,943 | 3/1995 | Chandrasekaran | 315/219 |
| 5,416,388 | 5/1995 | Shackle | 315/219 |
| 5,432,817 | 7/1995 | Hormel et al. | 375/257 |
| 5,434,477 | 7/1995 | Crouse et al. | 315/209 R |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 R |
| 5,515,433 | 5/1996 | Chen | 379/398 |
| 5,563,479 | 10/1996 | Suzuki | 318/139 |
| 5,574,335 | 11/1996 | Sun | 315/119 |
| 5,579,197 | 11/1996 | Mengelt et al. | 361/93 |
| 5,583,402 | 12/1996 | Moisin et al. | 315/307 |
| 5,608,295 | 3/1997 | Moisin | 315/247 |
| 5,608,595 | 3/1997 | Gourab et al. | 361/79 |
| 5,638,266 | 6/1997 | Horie et al. | 363/132 |
| 5,684,683 | 11/1997 | Divan et al. | 33/65 |
| 5,686,799 | 11/1997 | Moisin et al. | 315/307 |
| 5,691,606 | 11/1997 | Moisin et al. | 315/307 |
| 5,798,617 | 8/1998 | Moisin | 315/247 |
| 5,821,699 | 10/1998 | Moisin | 315/291 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,925,986 | 7/1999 | Moisin | 315/247 |

BALLAST CIRCUIT WITH LAMP CURRENT REGULATING CIRCUIT

CROSS REFERENCE TO RELATED APPLICATION

This application is a continuation-in-part of U.S. patent application Ser. No. 09/146,859, filed on Sep. 3, 1998, and entitled, "Converter/Inverter Circuit With a Single Switching Element."

FIELD OF THE INVENTION

The present invention relates generally to electrical circuits for energizing load and more particularly to a circuit having a full bridge configuration with a single switching element.

BACKGROUND OF THE INVENTION

There are many types of circuits for powering a load. One type of circuit for powering a load is an inverter circuit. An inverter circuit receives a direct current (DC) signal, from a rectifier for example, and outputs an alternating current (AC) signal. The AC output can be coupled to a load, such as a fluorescent lamp, or to a rectifier so as to form a DC-DC converter.

There are different types of inverter circuits which can have a variety of configurations. One type of inverter circuit, known as a half-bridge inverter circuit, includes first and second switching elements, such as transistors, coupled in a half-bridge configuration. Another type of inverter circuit referred to as a full-bridge inverter circuit includes four switching elements coupled in a full-bridge configuration. Half-bridge and full-bridge inverter circuits are typically driven at a characteristic resonant frequency determined by the impedance values of the various circuit elements.

For a resonant inverter, the current to the load periodically reverses direction. That is, the current flows through the load in a first direction for a first half of a resonant cycle and reverses direction after a period of time determined by the resonant frequency. The current then flows through the load in a second, opposite direction during a second half of the resonant cycle. For a half bridge inverter, the first switching element is conductive for the first half of the resonant cycle and the second switching element is conductive for the second half of the resonant cycle. And for a full bridge type configuration, first and second switching elements conduct for half of the resonant cycle and third and fourth switching elements conduct for the second half of the cycle.

To operate the circuit at or near resonance, the conduction states of the switching elements need to be controlled. Generally, each switching element is controlled by a respective control circuit which biases each switching element to a conductive state for about half of the resonant cycle and to a non-conductive state for the second half of the cycle. One type of control circuit includes an inductive bias element inductively coupled to a resonant inductive element through which current to the load flows. The bias element applies a potential to the switching element, such as to the base terminal of a bipolar junction transistor, for biasing the switching element to a conduction state that corresponds to a direction of current flow through the load. The switching element control circuits, as well as the switching elements themselves, can require significant space on a circuit board. It will be appreciated by one of ordinary skill in the art that, in general, space on a circuit board is at a premium.

A further drawback associated with certain ballasts occurs when a lamp fails to light. Due to the resonant nature of the inverter circuit, relatively high voltage levels can be generated when a lamp fails to light. Such high voltage levels can have a negative impact on circuit performance and may cause damage to the circuit components. In addition, a ballast coupled to multiple lamps may not provide satisfactory operation of the other lamps when one lamp fails to light. Further, ballast circuits are not generally modular so that a failure of a component associated with energizing one lamp or one set of lamps necessitates replacement of the entire ballast.

It would be desirable to provide a ballast circuit which regulates lamp current so as to prevent excessive voltage levels from occurring when a lamp fails to light. It would also be desirable to provide a ballast circuit that can energize different types of lamps. It would further be desirable to provide a ballast for independently energizing a plurality of lamps which has a plurality of replaceable modules to allow one or more faulty component associated with a particular lamp to be replaced.

SUMMARY OF THE INVENTION

The present invention provides a circuit for driving a load including a full bridge topology having a bridge leg with a single actively biased switching element. Although the circuit is primarily shown and described as a ballast circuit having an inverter circuit, it is understood that the invention is applicable to other circuits and loads as well, such as power supplies and DC motors.

In one embodiment, a circuit has a full bridge configuration with a single actively biased switching element. The bridge includes first, second, third and fourth circuit elements coupled to a load. The first circuit element is coupled to the second circuit element such that a first circuit loop includes the first and second circuit elements and the load. The third circuit element is coupled to the fourth circuit element such that a second circuit loop includes the third and fourth circuit elements and the load. And a third, outer circuit loop includes the first, second, third and fourth circuit elements, one of which comprises the switching element.

In one particular embodiment, the circuit is a resonant inverter circuit including a diode coupled to a bridge switching element such that the diode is coupled to a positive rail of the inverter and the bridge switching element is coupled to a negative rail. The circuit further includes first and second bridge capacitors coupled end to end between the positive and negative rails of the inverter. The bridge switching element, the first bridge capacitor and the load form a first circuit loop and the diode, the second bridge capacitor and the load form a second circuit loop. And the diode, the bridge switching element and the bridge capacitors form a third or outer circuit loop.

In a further embodiment, the inverter circuit includes a discharge switching element coupled to the bridge switching element to reduce a transition time of the bridge switching element to a non-conductive state. In one particular embodiment, the bridge switching element is a field effect transistor (FET) and the discharge switching element is a bipolar transistor (BJT). The relatively rapid transition of the bipolar discharge transistor to a conductive state provides a path for energy in the FET bridge transistor to flow to a negative rail of the inverter thereby reducing the delay time of the FET.

In another embodiment, the inverter circuit includes a threshold detection circuit coupled to the bridge switching element for reducing the duty cycle of the bridge switching element when the energy level exceeds a predetermined level. In one embodiment, the threshold detection circuit includes at least one feedback resistor coupled to a threshold switching element. The threshold switching element is coupled to the bridge switching element for controlling the conduction state thereof. When the current through the feedback resistor increases to a level above a predetermined threshold, the threshold switching element transitions to a conduction state that is effective to cause the bridge switching element to switch to a non-conductive state.

In a further embodiment, an integrated circuit (IC), such as a current mode controller (CMC), is used to control the duty cycle of the single actively biased switching element, such as a FET. In one embodiment, a first terminal of the CMC IC is coupled to the gate terminal of the FET, a second terminal of the IC is coupled to the FET source terminal, and a third IC terminal is coupled to point between voltage dividing resistors coupled end to end between positive and negative rails of the inverter. The CMC IC alternately biases the FET to conductive and non-conductive states via a conduction control signal provided on the CMC IC first terminal which is coupled to the FET gate terminal.

In another embodiment, a duty cycle control circuit is coupled between the first output terminal of the current mode controller IC and the FET gate terminal for altering the duty cycle of the FET. It is understood that the duty cycle control circuit is not limited to connection with an IC and that switching elements other than an FET can be used. When the energy level to the lamp becomes greater than a predetermined threshold, the duty cycle control circuit causes the FET to transition to a non-conductive state. The duty cycle control circuit maintains the FET in the OFF state until the next cycle where the conduction control signal transitions to a polarity corresponding to conductive state for the FET. The duty cycle circuit thereby regulates the lamp current to a predetermined level such that the ballast can energize lamps having a particular operating current level and differing voltage drops.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
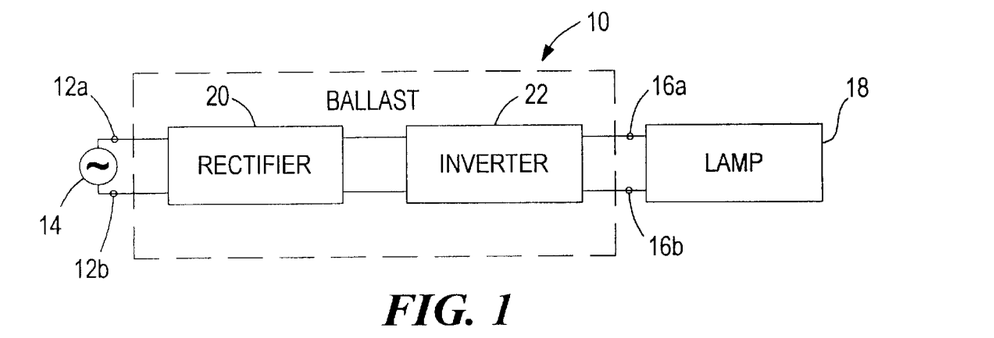
FIG. 1 is a schematic block diagram of a lamp system including a ballast circuit in accordance with the present invention, the ballast circuit having an inverter circuit.

FIG. 1 shows a ballast circuit 10 in accordance with the present invention. The ballast circuit 10 includes first and second input terminals 12a,b coupled to an alternating current (AC) power source 14 and first and second output terminals 16a,b coupled to a load 18, such as a fluorescent lamp. The ballast circuit 10 has a rectifier circuit 20 for receiving the AC signal and providing a direct current (DC) signal to an inverter circuit 22, which as described below, has a single actively biased switching element. The inverter circuit 22 energizes the lamp 18 with an AC signal that is effective to cause the lamp to emit light.

Figure 2:
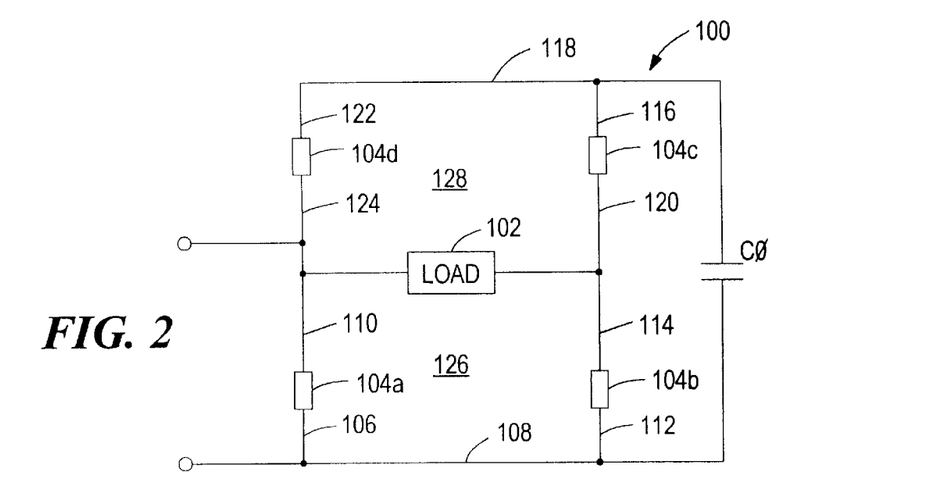
FIG. 2 is a schematic block diagram showing further details of the inverter circuit of FIG. 1.

FIG. 2 shows an exemplary embodiment of an inverter circuit 100, which can be used as the inverter circuit 22 of FIG. 1. The inverter 100 has a full bridge topology with a single actively bias switching element that, as described below, is effective to energize a load 102. The bridge includes circuit elements 104a–d, one of which is the actively biased switching element. A first bridge element 104a has a first terminal 106 coupled to a negative rail 108 of the inverter and a second terminal 110 coupled to the load 102. The second bridge element 104b has a first terminal 112 coupled to the negative rail 108 and a second terminal 114 coupled to the load 102 such that the load is connected between the second terminals 110,114 of the first and second circuit elements 104a,b. The third bridge element 104c, has a first terminal 116 coupled to a positive rail 118 of the inverter and a second terminal 120 coupled to the second terminal 114 of the second bridge element 104b. The fourth bridge element 104d has a first terminal 122 coupled to the positive rail 118 and a second terminal 124 coupled to the second terminal 110 of the first bridge element. The load 102, as connected in the circuit, divides the circuit into a first half 126 that includes the first and second bridge elements 104a,b and a second half 128 that includes the third and fourth bridge elements 104c,d. The circuit can also include a storage capacitor C0 coupled between the positive and negative rails 118,108 of the inverter.

Figure 3:
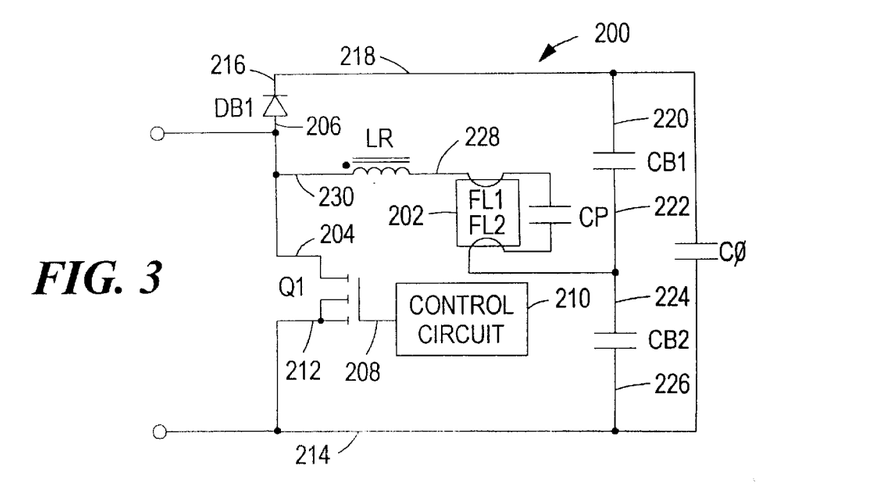
FIG. 3 is a circuit diagram of an exemplary embodiment of the inverter circuit of FIG. 2.

It is understood that an actively biased switching element, as used herein, refers to a switching element having a terminal coupled to a circuit for the purpose of controlling a conduction state of the switching element. For example, as shown in FIG. 3, the gate terminal 208 of the bridge switching element Q1 is coupled to the control circuit 210 for controlling the conduction state of the bridge switching element Q1. Thus, the bridge switching element Q1 is actively biased. In contrast, the bridge diode DB1 does not include such a control terminal and, therefore, is not an actively biased switching element.

FIG. 3 shows an exemplary circuit embodiment of a full bridge inverter circuit 200 with a single actively biased switching element. The inverter circuit 200 includes a bridge switching element Q1, which is actively biased, a bridge diode DB1, and first and second bridge capacitors CB1,CB2. An exemplary value for the bridge capacitors CB1,CB2 is 0.1 microFarads. Coupled to the bridge is a resonant inductive element LR, a lamp 202 and a parallel capacitor CP. The bridge switching element Q1, shown as a field effect transistor (FET), has a first or drain terminal 204 coupled to an anode 206 of the bridge diode DB1, a second or gate terminal 208 coupled to a control circuit 210 and a third or source terminal 212 coupled to a negative rail 214 of the inverter. The anode 206 of the bridge diode DB1 is coupled to the switching element Q1 and a cathode 216 is coupled to a positive rail 218 to which a first terminal 220 of the first bridge capacitor CB1 is connected. A second terminal 222 of the first bridge capacitor CB1 is coupled to a first terminal 224 of the second bridge capacitor CB2 which has a second terminal 226 coupled to the negative rail 214 of the inverter. Coupled across the positive and negative rails 218,214 is a storage capacitor C0 which has an exemplary value of about 33 microFarads.

The lamp 202 includes first and second filaments FL1, FL2 across which the parallel capacitor CP is connected. The first filament FL1 is also connected to a first terminal 228 of the resonant inductive element LR and the second filament FL2 is also coupled to a point between the first and second bridge capacitors CB1,CB2. A second terminal 230 of the resonant inductive element LR is coupled to a point between the bridge diode DB1 and the bridge switching element Q1.

The circuit 200 is shown as a resonant inverter circuit having a characteristic resonant frequency determined by the impedance values of the various circuit elements, such as the resonant inductive element LR, the parallel capacitor CP and the lamp 202. When the circuit is driven at a frequency at or near the characteristic resonant frequency, the lamp 202 is energized with an AC signal that is effective to cause current to flow through the lamp and emit visible light. During a first half of a resonant cycle, current flows in one direction from the resonant inductive element LR to the lamp 202 and during the second half of the resonant cycle the current flows from the lamp 202 to the resonant inductive element LR. The current reverses direction after a time determined by the resonant frequency of the circuit. Operation of the exemplary circuit is described further in conjunction with FIGS. 4–4C.

Figure 4:
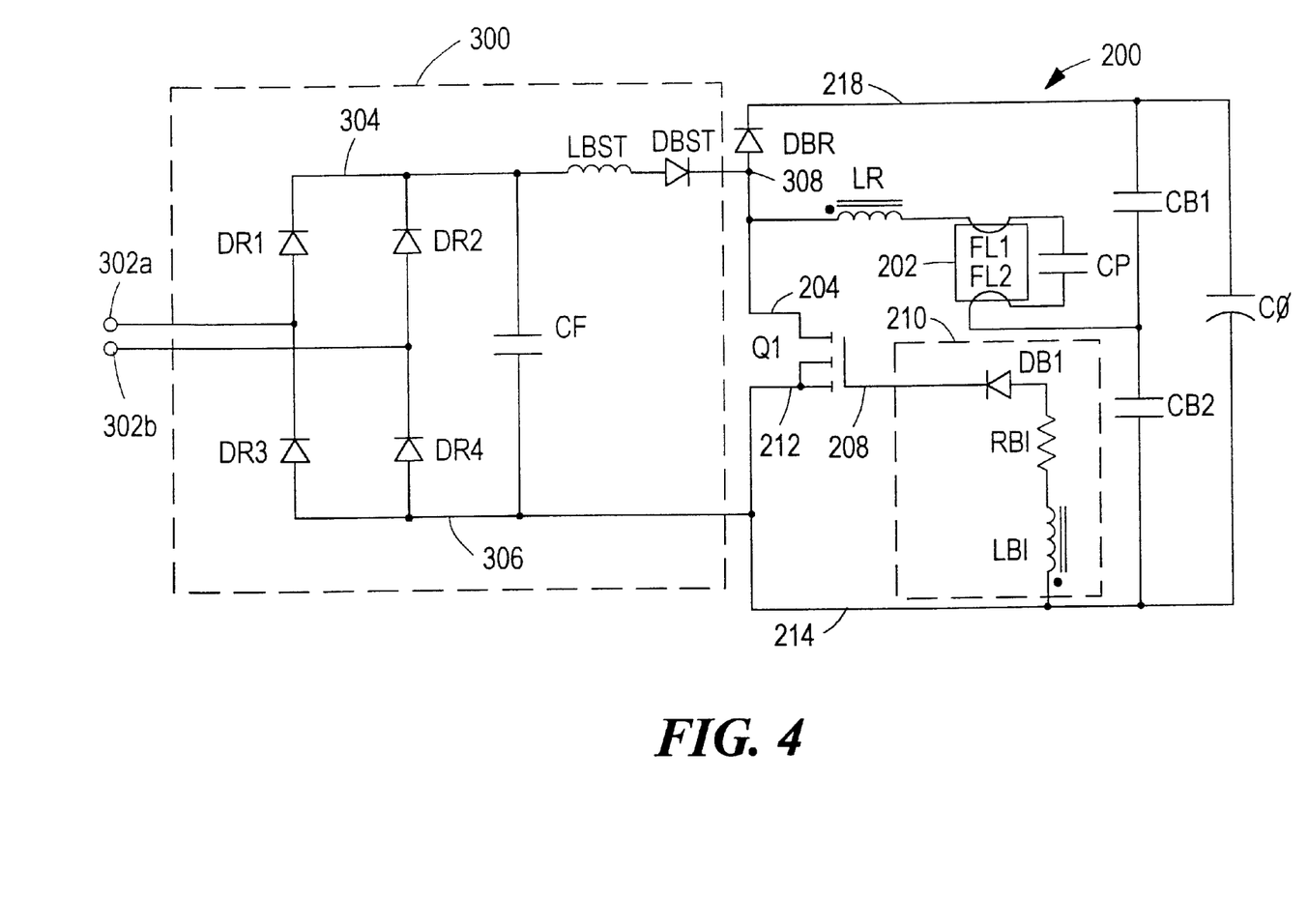
FIG. 4 is a circuit diagram showing further details of the circuit of FIG. 3.

FIG. 4 shows the inverter circuit 200 of FIG. 3 coupled to a rectifier/boost circuit 300, wherein like reference designations indicate like elements. An exemplary embodiment of the control circuit 210 is also shown. The rectifier/boost circuit 300 has first and second input terminals 302a,b for receiving an AC signal from an AC power source, such as the AC source 14 shown in FIG. 1. The AC signal is rectified by four rectifier diodes DR1–4 coupled in a bridge configuration to provide a positive output 304 and a negative output 306 across which a filter capacitor CF is coupled. A boost inductor LBST and a boost diode DBST are coupled in series between the positive output 304 of the rectifier and an input 308 of the inverter. The negative output 306 of the rectifier is coupled to the negative rail 214 of the inverter circuit. Operation of the rectifier/boost circuit 300 is well known to one of ordinary skill in the art. Suffice it here to say that the rectifier 300 receives an AC signal and provides a DC signal to the inverter 200 at terminals 200a,b.

The control circuit 210 controls the conduction state of the switching element Q1 and includes an inductive bias element LBI, a resistor RBI and a diode DBI coupled in series between the gate 208 of the FET Q1 and the negative rail 214 of the inverter. The bias element LBI is inductively coupled to the resonant bias element LR. The respective polarities of the bias element LBI and the resonant inductive element LR are indicated with conventional dot notation, as shown. As known to one of ordinary skill in the art, the dot corresponds to a rise in voltage from the unmarked end to the marked end. The polarities of the voltages (FIGS. 4A–C) at the respective marked and unmarked ends of the resonant and bias inductive elements LR,LBI are shown with a "+" to indicate a positive potential and a "−" to indicate a negative potential.

Figure 4A:
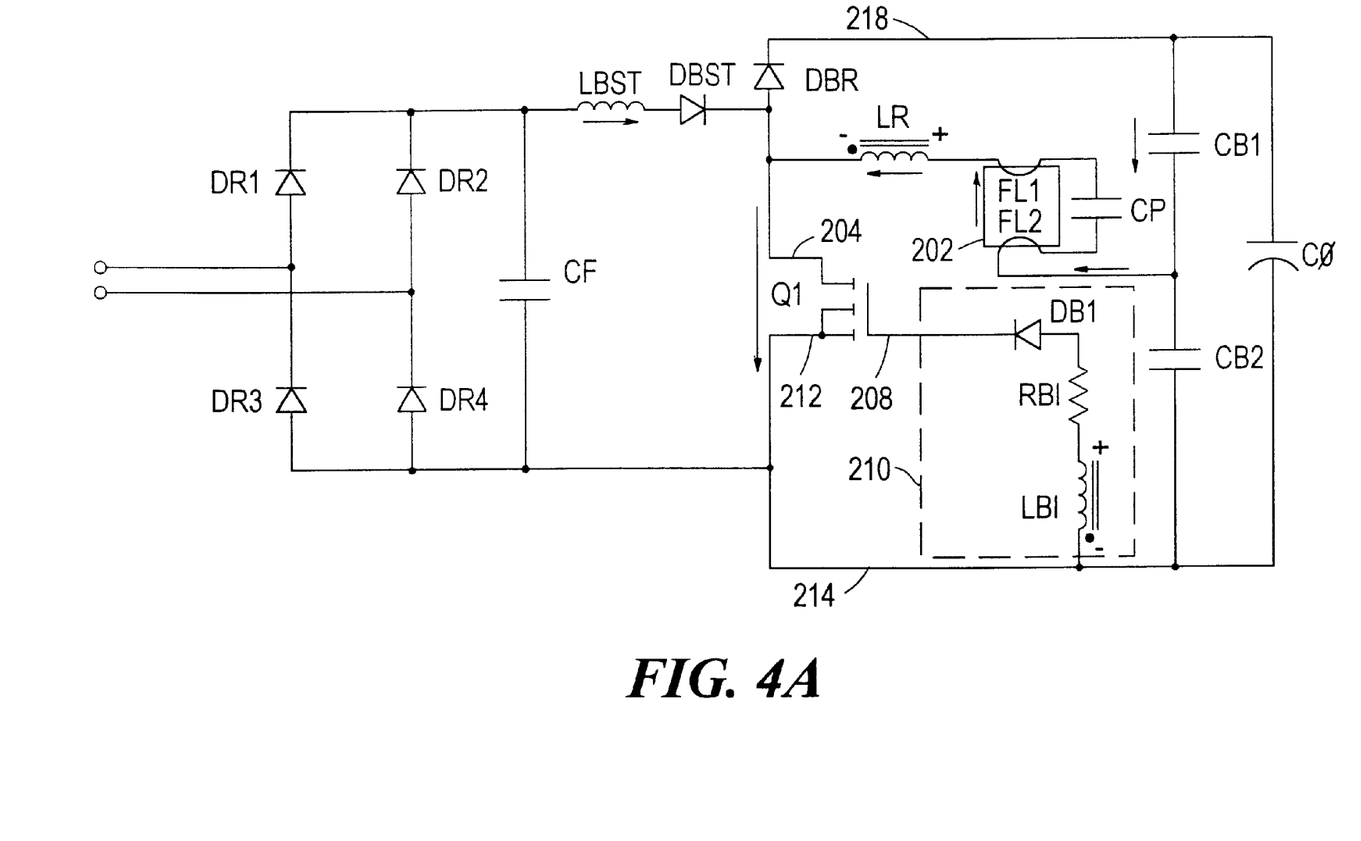
FIG. 4A is a circuit diagram showing energy flow through the circuit of FIG. 4 at a first time.
Figure 4B:
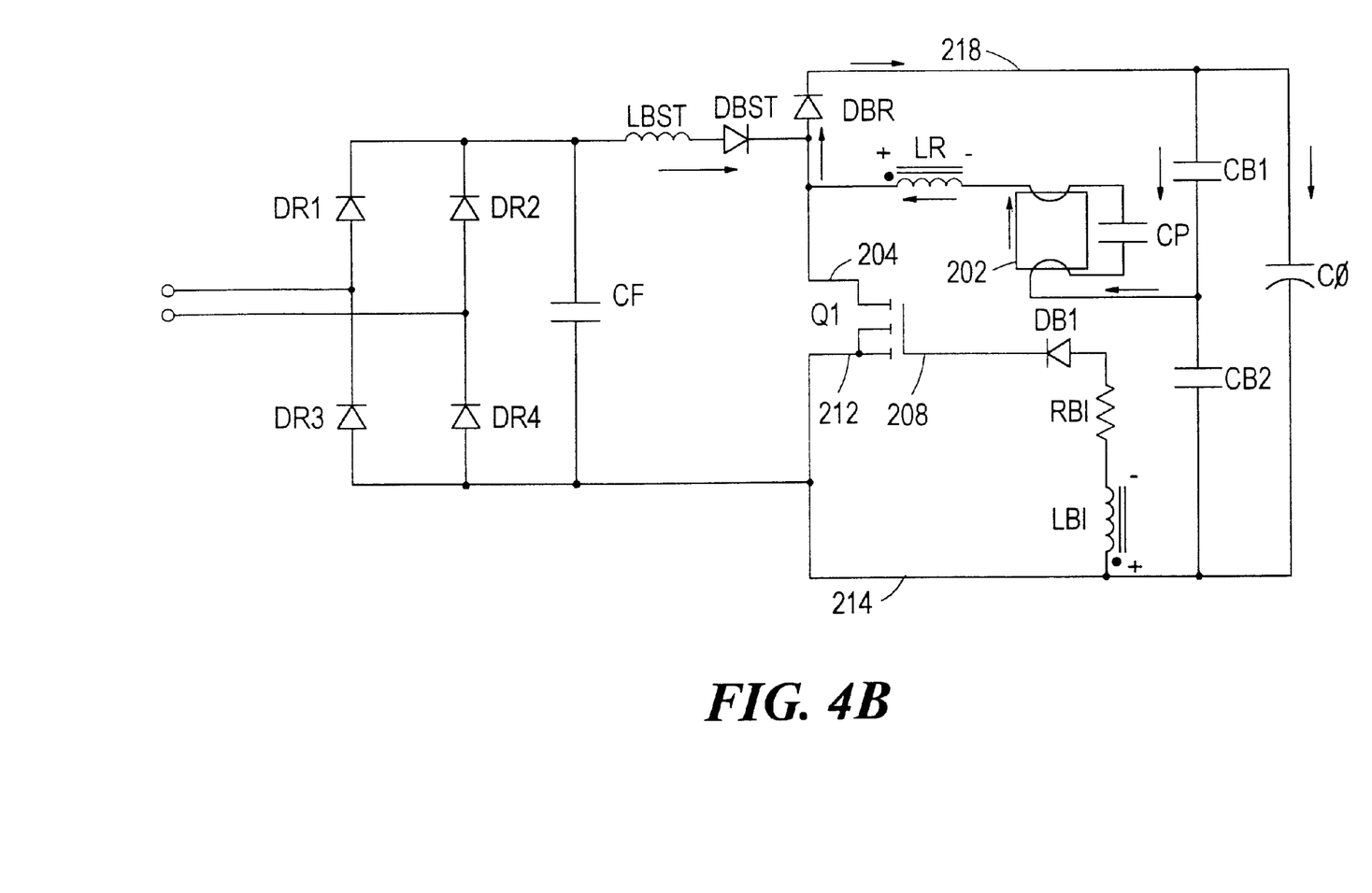
FIG. 4B is a circuit diagram showing energy flow through the circuit of FIG. 4 at a second time.
Figure 4C:
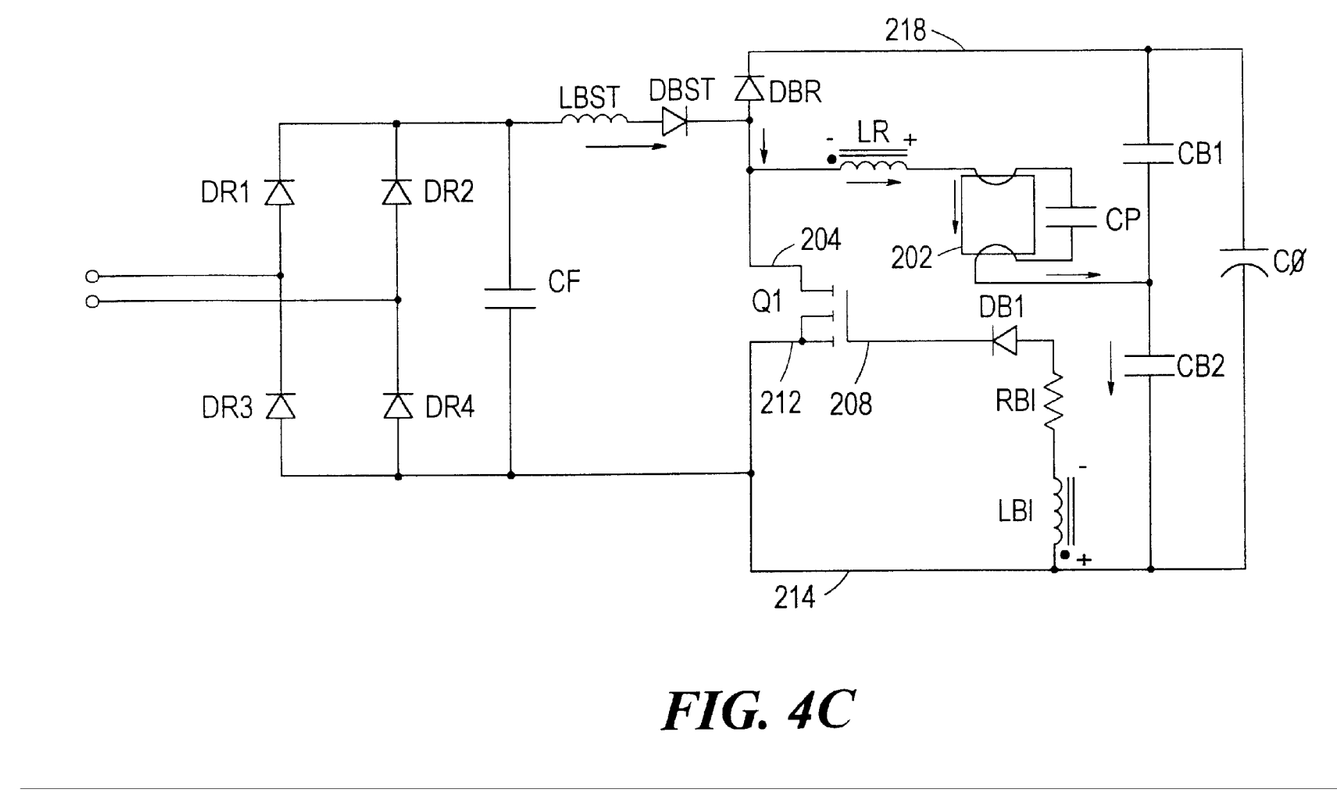
FIG. 4C is a circuit diagram showing energy flow through the circuit of FIG. 4 at a third time.

FIGS. 4A–C show the direction of current flow through the circuit at different times during resonant operation, as described below. FIG. 4A shows the direction of current flow through the rectifier and boost circuits 200,300 circuit as the switching element Q1 is ON. It is understood that, as used herein, the term ON refers to a conductive state of a switching element, such as a transistor, and that OFF refers to a non-conductive state of a switching element. Current is flowing in a direction from the lamp 202 to the resonant inductor LR. Current is also flowing through the boost inductor LBST from the rectifier and through the switching element Q1, as well as through the first bridge capacitor CB1 to the lamp 202. The direction of current flow is indicated by the arrows, as shown. As current flows through the resonant inductive element LR, the bias element LBI maintains the bias of the FET Q1 to its ON state by providing a potential to the gate terminal 208. And while the FET Q1 is ON, energy stored in the storage capacitor C0 and the boost inductor LBST from a previous cycle is transferred to the lamp 202.

After a time determined by the resonant frequency of the circuit, the current will reverse direction. However, since voltage leads current, the polarities of the potentials generated by the resonant and inductive elements LR,LBI switch before the current reverses direction.

As shown in FIG. 4B, after the voltage at the bias element LBI switches polarity, the switching element Q1 is biased to the OFF state. And after the resonant inductive element LR switches polarity, the bridge diode DBR is forward biased such that current now flows to the positive rail 218 of the inverter through the diode DBR and charges the storage capacitor C0.

FIG. 4C shows the circuit after the current switches direction such that it flows from the resonant inductive element LR to the lamp 202 and negative rail 214 via the second bridge capacitor CB2. Current no longer flows through the bridge diode DBR. And after a time determined by the resonant frequency, the voltages will switch polarity and bias the FET Q1 to the ON state and current will begin to flow through Q1, as described in FIG. 4A.

As described above, the conduction state of the bridge diode DBR is determined by the balance of currents flowing through the circuit elements. Thus, the diode DBR effectively operates as a switching element without the need for a control circuit. The bridge diode DBR also fixes a voltage at the junction of the boost and bridge diodes DBST,DBR to the voltage that appears across the positive and negative rails 218,214 of the inverter subject to the voltage drop (about 0.7 volts) across the bridge diode DBR when it is conductive.

The circuit also provides increased efficiency since energy flows directly to the lamp 202 from the rectifier when the bridge switching element Q1 is OFF. By contrast, in conventional bridge configurations, energy is stored in the circuit components during each half cycle which then flows to the load during the next half cycle.

Figure 5:
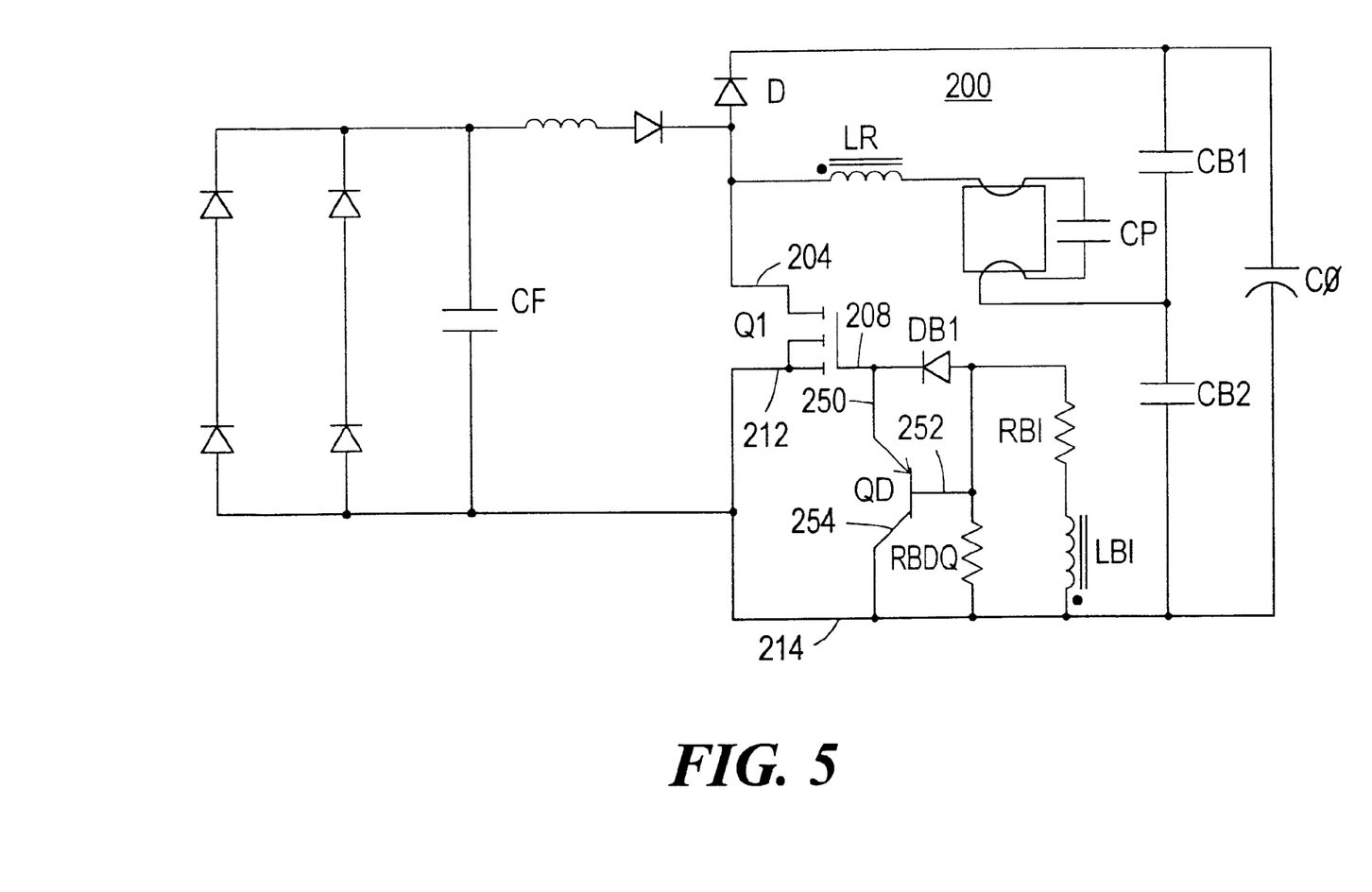
FIG. 5 is a circuit diagram of a further embodiment of a circuit in accordance with the present invention.

In a further embodiment shown in FIG. 5, the circuit 200 further includes a discharge switching element QD coupled to the bridge switching element Q1 for rapid switching thereof. In one particular embodiment, the discharge switching element QD is a pnp transistor having an emitter terminal 250 coupled to the gate terminal 208 of the FET Q1, a base terminal 252 coupled to the unmarked end of the bias element LBI via the resistor RBI, and a collector terminal 254 coupled to the negative rail 214. When the bias element LBI applies a negative potential to the gate terminal 208 of the FET Q1 to turn it OFF, the bias element LBI also biases the discharge transistor QD to a conductive state thereby providing a path for energy stored in the FET to discharge to the negative rail 214. This enhances the switching ability of the FET Q1 for a more rapid transition to the OFF state.

Figure 6:
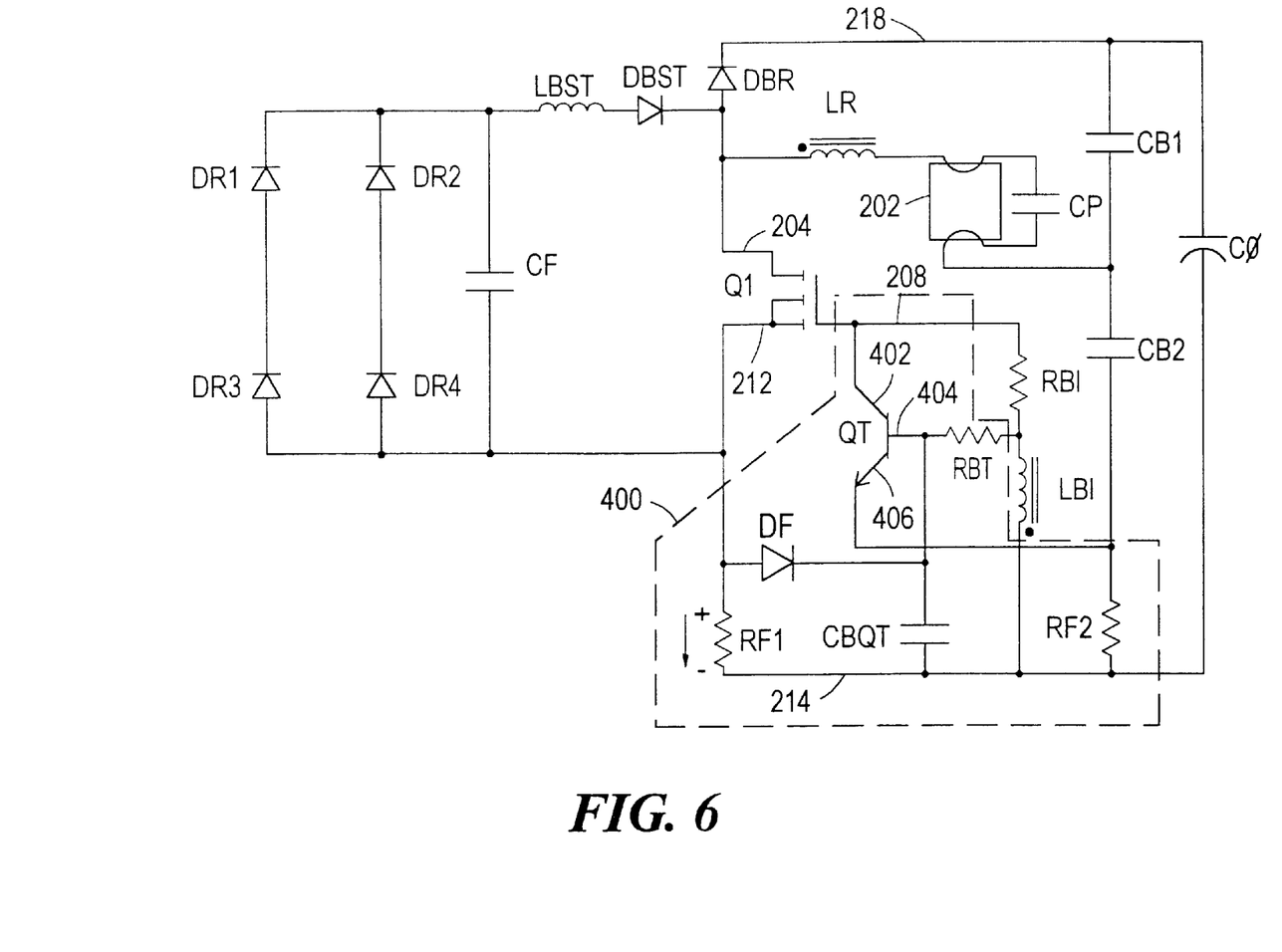
FIG. 6 is a circuit diagram of another embodiment of a circuit in accordance with the present invention.

In another embodiment shown in FIG. 6, the circuit 200 also includes a threshold detection circuit 400 for detecting a current level through the switching element Q1 that is greater than a predetermined threshold. Upon detecting an excessive power condition, the duty cycle of the switching element Q1 can be reduced or the circuit can be shut down.

In one embodiment, the threshold detection circuit 400 includes a threshold switching element QT, first and second feedback resistors RF1,RF2, a diode DF, and a base capacitor CBQT. The threshold switching element QT, shown as an npn transistor, has a collector terminal 402 coupled to the gate terminal 208 of the FET Q1, a base terminal 404 coupled to the unmarked end of the bias element LBI via a resistor RBT, and an emitter terminal 406 coupled to the negative rail 214 via the second feedback resistor RF2. The first feedback resistor RF1 is coupled between the source terminal 212 of the FET Q1 and the negative rail 214 such that current flowing from the FET Q1 flows through the first feedback resistor RF1. The second feedback resistor RF2 is coupled between the negative rail 214 and the second bridge capacitor CB2. The diode DF is connected between the source terminal 212 of the FET Q1 and the capacitor CBQT which is coupled between the negative rail 214 and the base terminal 404 of QT.

The threshold circuit 400 is effective to turn the FET Q1 OFF when the current through the FET Q1 exceeds a predetermined level. More particularly, when the threshold switching element QT is biased to a conductive state, the FET Q1 is turned OFF. A current flow through the FET Q1 generates a first voltage drop across the first feedback resistor RF1 which is applied to the base terminal 404 of the transistor QT via the diode DF. A voltage appearing at the bias element LBI also appears at the base terminal 404 of the threshold switching element QT. The emitter terminal 406 of the transistor QT is biased by a voltage drop across the second feedback resistor RF2 due to a current flowing from the negative rail 214 of the inverter. In general, when the current through the FET Q1 is greater than a predetermined threshold determined in large part by the impedance value of the first feedback resistor RF1, the transistor QT turns ON thereby turning the FET Q1 OFF. The circuit thereby limits the current through the bridge switching element Q1 so as to prevent excess signal levels from damaging the circuit.

Figure 7:
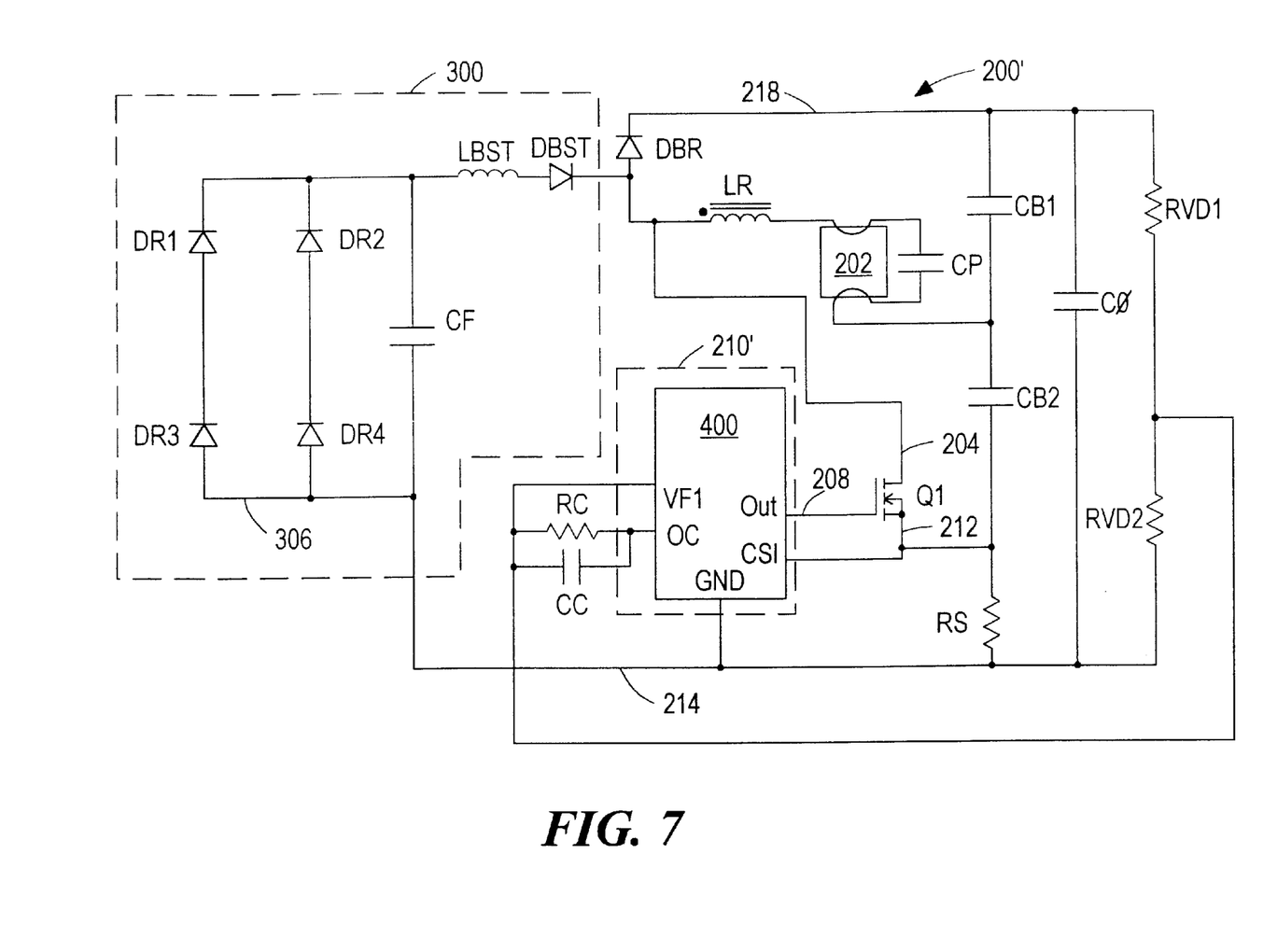
FIG. 7 is a circuit diagram of still another embodiment of a circuit in accordance with the present invention.

FIG. 7 shows a ballast circuit 200' having a control circuit 210' provided as an integrated circuit (IC) 400 which can be a current mode controller (CMC), such as those of the type manufactured by Motorolla Company of Schaumborg, Ill., and identified as UC2844, UC2845, UC3844 and UC3845. An output terminal OUT of the controller 400 is coupled to the gate terminal 208 of the FET Q1 for controlling the conduction state of the FET. The controller 400 includes a voltage feedback input terminal VFI connected to a point between first and second voltage divider resistors RVD1, RVD2 which are coupled end to end between the positive and negative rails 218,214 of the inverter 200'. Resistor RC and capacitor CC are coupled in parallel between the input terminal VF1 and an output compensation terminal OC of the controller to provide compensation to internal components of the controller 400. A reference terminal GND of the controller is coupled to the negative rail 214 of the inverter 200' and to a current sense input terminal CSI of the controller 400 via sense resistor RS. The CSI terminal is also coupled to the source terminal 212 of the FET Q1. The sense resistor RS is coupled between the second bridge capacitor CB2 and the negative rail 214 of the inverter 200'.

The controller 400 is effective to control the conduction state of the FET Q1 via the gate terminal 208 based upon the voltage detected between the voltage divider resistors RVD1,RVD2 and the voltage present across the sense resistor RS which corresponds to a level of current flow through the FET Q1. A conduction control signal provided on the output terminal OUT of the CMC IC 400 alternately biases the FET gate terminal 208 to conductive or ON and non-conductive or OFF states. In one embodiment, the conduction control signal has a first polarity, such as a high state corresponding to a conductive state and a second polarity or low state corresponding to a non-conductive state. Current flow through the inverter 200' is as shown and described above in conjunction with FIGS. 4A–C.

Figure 8:
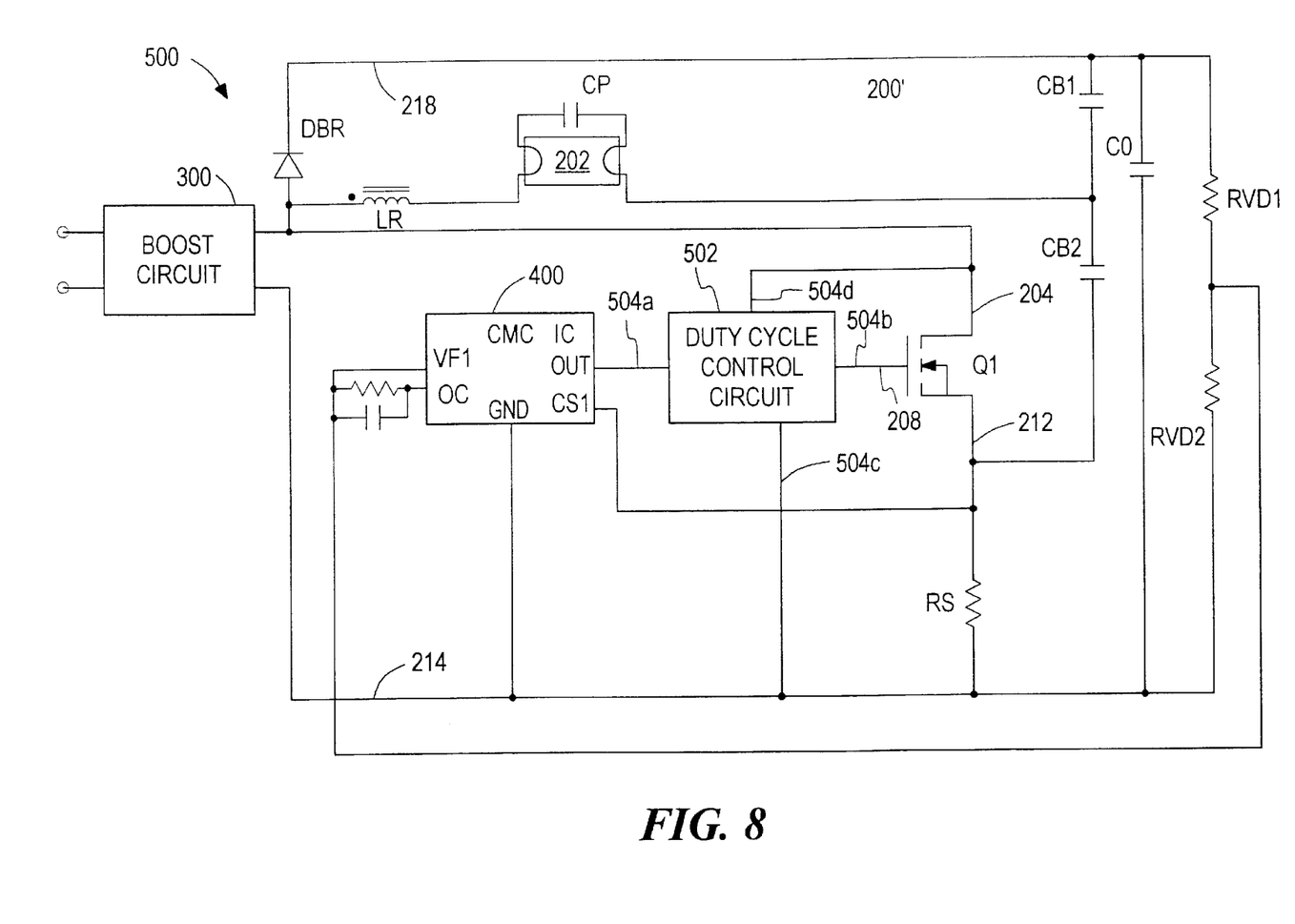
FIG. 8 is a circuit diagram of yet another embodiment of a circuit in accordance with the present invention.

FIG. 8 shows a ballast circuit 500 having a rectifier/boost circuit 300 for providing a DC signal to an inverter circuit 200' having a single actively biased switching element Q1, which has a conduction state controlled by a current mode controller IC (CMC IC) 400. The rectifier/boost circuit 300, the inverter 200', and the CMC IC 400 are shown and described above in conjunction with PIG. 7. The ballast 500 further includes a duty cycle control circuit 502 for modifying a duty cycle of the switching element Q1. The duty cycle control circuit 502 has a first terminal 504a coupled to the output terminal OUT of the CMC IC 400 and a second terminal 504b coupled to the gate terminal 208 of the switching element Q1. A third terminal 504c of the duty cycle control circuit 502 is coupled to the negative rail 214 of the inverter 200' and a fourth terminal 504d is connected to the FET drain terminal 204.

As described above, the OUT terminal of the CMC IC 400 provides a conduction control signal for alternately biasing the switching element Q1, via the gate terminal 208, to conductive and non-conductive states. In one embodiment, a first polarity, such as a high signal, corresponds to a conductive state for the FET and a second polarity, such as a low signal, corresponds to a non-conductive state. In normal operation, the duty cycle control circuit 502 passes the conduction control signal to the FET without modifying the polarity of the signal. However, when the power to the lamp 202 becomes greater than a predetermined threshold, the duty cycle control circuit 502 alters the conduction control signal so as to provide a low signal to the FET gate terminal 208, which causes the switching element Q1 to transition to a non-conductive state. The duty cycle control circuit 502 then maintains the switching element Q1 in the OFF state until the next cycle of the CMC IC 400 when the conduction control signal on the output terminal OUT transitions to the high state.

Figure 9:
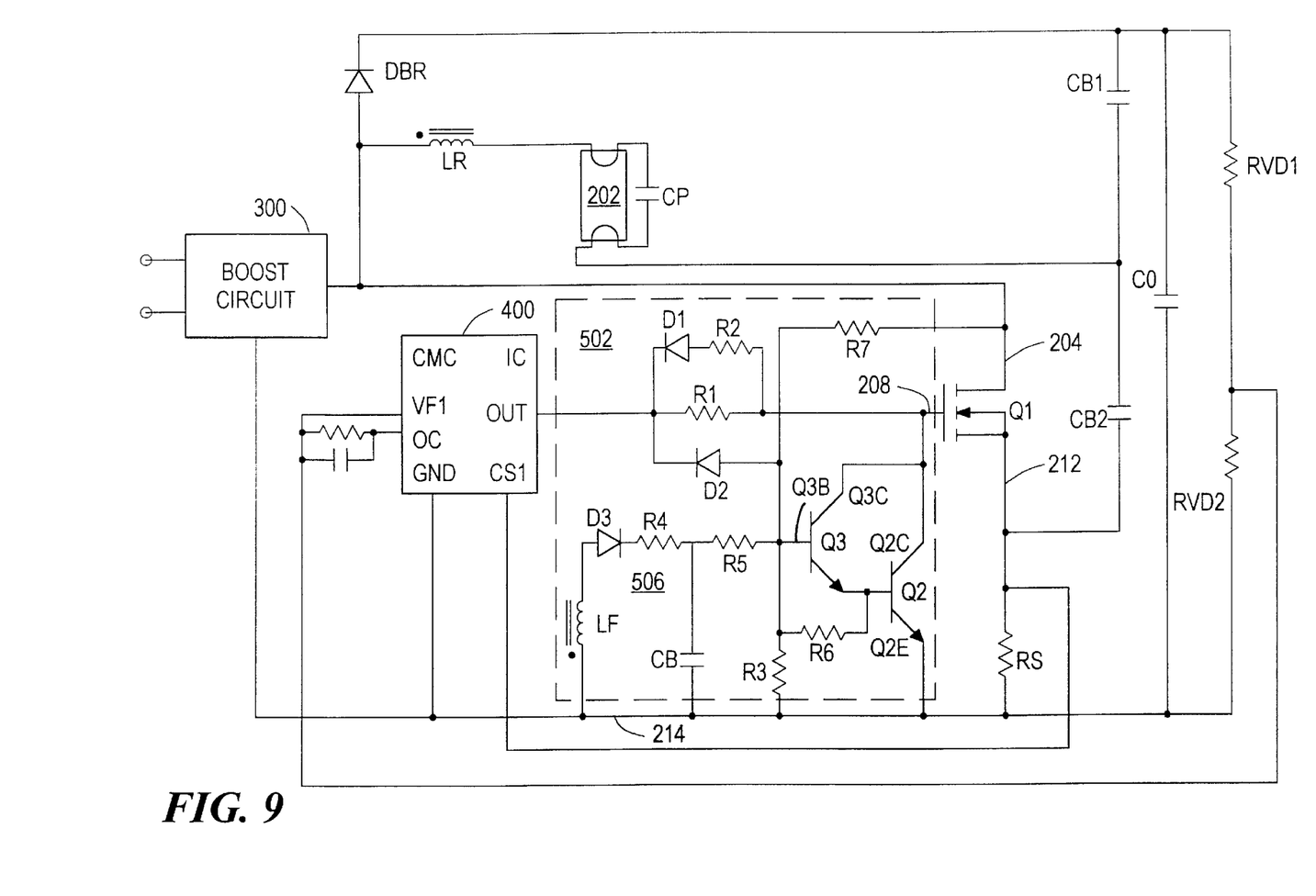
FIG. 9 is a circuit diagram of an exemplary implementation of the circuit of FIG. 8.

FIG. 9 shows an exemplary circuit implementation of the duty cycle control circuit 502 of FIG. 8. The output terminal OUT of the CMC IC 400 is coupled to the FET Q1 gate terminal 208 via a first resistor R1. A first diode D1 and a second resistor R2 are coupled in series across the first resistor R1. A second diode D2 and a third resistor R3 provide a series circuit path to the negative rail 214 of the inverter. Second and third switching elements Q2,Q3, here shown as transistors, are coupled in a Darlington configuration with the collector terminals Q2C,Q3C connected to the gate terminal 208 of the first switching element Q1 and an emitter terminal Q2E of the second switching element Q2 connected to the negative rail 214. A Q3 control circuit 506 is coupled to the base terminal Q3B of the third switching element Q3 for controlling the conduction state of the Q2/Q3 Darlington-coupled transistors. The Q3 control circuit 506 includes an RC network including R4,R5,R6,CB and an inductive feedback element LF, which is inductively coupled to resonant inductive element LR.

The base terminal Q3B of the third switching element Q3 is also coupled to the drain terminal 204 of the first switching element Q1 via a resistor R7.

In operation, the CMC IC 400 biases the first switching element Q1 to a conductive or ON state by providing a positive polarity or high signal on the CMC IC 400 output terminal OUT (conduction control signal). A low signal on the OUT terminal biases the FET Q1 to a non-conductive state. If power to the lamp 202 remains below a predetermined threshold, then the conduction control signal provided by the CMC IC 400 determines the duty cycle of the first switching element Q1, e.g. normal operation.

If the power to the lamp 202 increases to a level above the predetermined threshold, then the duty cycle control circuit 502 overrides the high signal on the CMC IC 400 output terminal OUT such that a low signal is applied to the FET Q1 gate terminal 208 which causes Q1 to transition to a non-conductive state and thereby reduce power at the lamp 202. More particularly, current through the resonant inductive element LR, which corresponds to energy applied to the lamp 202, induces a corresponding voltage at the inductive feedback element LF. The signal at the feedback element LF is rectified by the diode D3 and the capacitor CB so as charge CB to a corresponding voltage level. When this voltage is sufficient to bias the base terminal Q3B of the Q2/Q3 Darlington pair to a conductive state, the first switching element Q1 is turned OFF by effectively shorting the FET Q1 gate terminal 208 to the negative rail 214 via transistors Q2,Q3.

After the first switching element Q1 is turned OFF, the transistors Q2,Q3 remain conductive, due to a positive potential signal provided by a feedback path from the resonant inductive element LR and the boost circuit 300 via the resistor R7. Thus, the first switching element Q1 is latched OFF for the remainder of the positive cycle of the conduction control signal on the CMC IC 400 OUT terminal.

When the CMC IC 400 OUT signal transitions to a low signal, which corresponds to an OFF state for Q1, the capacitor Cl discharges via diode D2. And while the conduction control signal on the OUT terminal is low, the first switching element Q1 is biased to a non-conductive or OFF state. When the conduction control signal on the CMC IC OUT terminal subsequently transitions to a positive polarity or high state, the first switching element Q1 is biased to a conductive or ON state and the capacitor CB begins to store charge from the feedback element LF, as well as via resistors R5,R7.

The duty cycle control circuit 502 regulates the lamp current to a predetermined level. By regulating the current level, the ballast can energize a family of lamps having a common operating current level and having differing voltage drops. As known to one of ordinary skill in the art, the diameter of a lamp determines the amount of current that is required and the voltage drop across the lamp corresponds to the length of the lamp. That is, the longer the lamp the greater the voltage drop across the lamp while the operating current level remains the same. Thus, the duty control circuit 502 allows the ballast to energize lamps having a particular diameter and different lengths.

The duty cycle control circuit 502 also prevents excessive power levels from occurring in the circuit, which if left unchecked, may damage ballast circuit components. For example, when a marginally operational lamp fails to light relatively high voltage levels can be applied to the lamp due to the resonant nature of the inverter circuit. Such a lamp can be near its so called end-of-life. The duty cycle control circuit 502 prevents excessive voltage levels from being applied to the lamp 202 when it fails to light by turning OFF the first switching element Q1, as described above.

Figure 10:
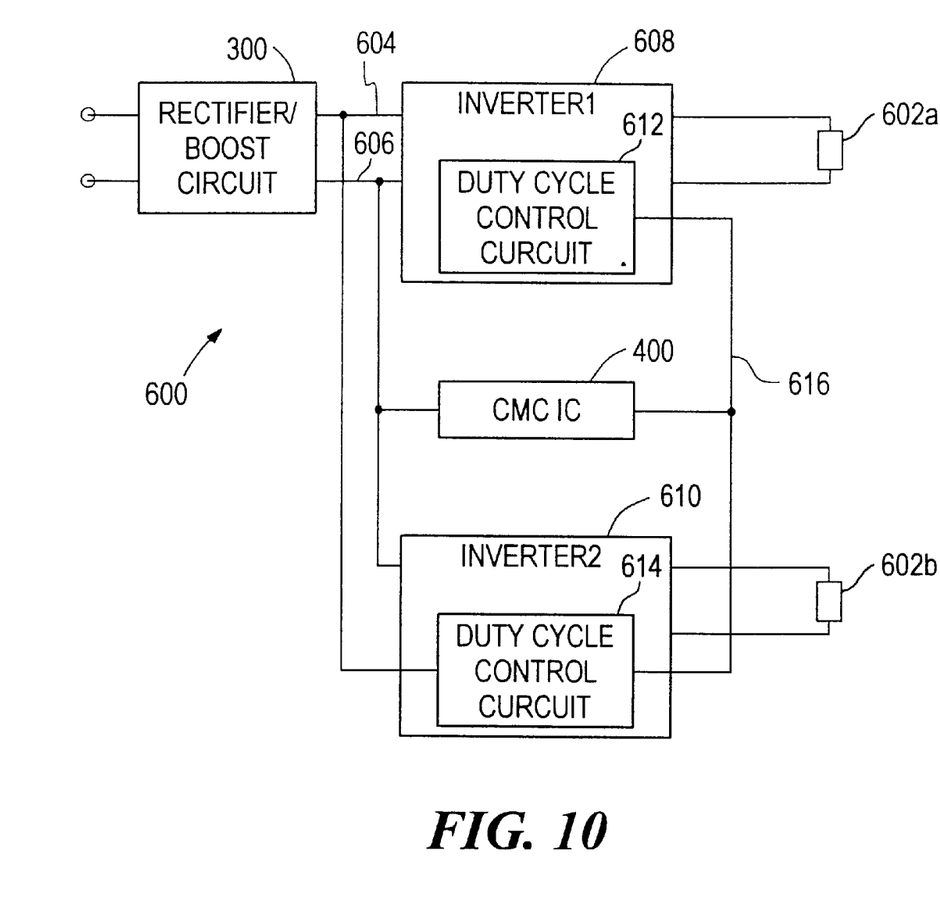
FIG. 10 is a block diagram of a further embodiment of a circuit in accordance with the present invention.

FIG. 10 shows a modular ballast circuit 600 for independently driving multiple lamps 602a,b. By providing a modular ballast, a failure of one circuit component need not require replacement of the entire ballast. The ballast 600 also prevents the failure of one lamp from interfering with the operation of other lamps.

The ballast 600 includes a rectifier/boost circuit 300 which provides positive and negative voltage reference signals 604,606 to a first inverter 608 for energizing the first lamp 602a and to a second inverter 610 for energizing the second lamp 602b. Each of the inverters 608,610 includes a respective duty cycle control circuit 612,614 for limiting the power to the lamps 602a,b. A Current Mode Controller (CMC) Integrated Circuit (IC) 400 provides a conduction control signal 616 to each of the duty cycle control circuits 612,614. As described above in conjunction with FIG. 9, the CMC IC 400 alternately biases the inverter switching elements (not shown) to conductive and non-conductive states to provide operational voltage and current levels to the lamps 602a,b.

In the case where a voltage applied to one of the lamps, the first lamp 602a for example, increases to an unacceptably high level the first duty cycle control circuit 612 causes the inverter switching element to turn OFF. An excessive voltage level may occur if the first lamp 602a fails to light, for example. However, operation of the second lamp 602b is unaffected. That is, the CMC IC 400 controls the duty cycle of the second switching element Q2 without alteration by the second duty cycle control circuit 614. While a single CMC IC 400 provides a conduction control signal 616 to the first and second inverters 608,610, the first and second lamps 602a,b operate independently such that a failure of one lamp does not affect the performance of the other lamp.

It is understood that further inverters can be coupled to the CMC IC 400 for independently energizing further lamps.

The modular aspect of the ballast 600 is achieved by grouping the various components into modules that can be replaced as needed without discarding the entire ballast. In one embodiment, the ballast includes modules which correspond to the blocks shown in FIG. 10. That is, the rectifier/boost circuit 300, each of the inverters 608,610, each of the duty cycle control circuits 612,614 and the CMC IC 400 each correspond to a particular module. Such modularity enables a user to remove a failed module, e.g., the first duty cycle control circuit 612, and replace it with a new module.

It will be appreciated that many other configurations for the modules, as well as the location of the various components within the modules, are possible. For example, a switching element may be part of either of the inverter or the duty cycle control circuit. Further, the CMC IC may be part of a module containing the rectifier/boost circuit 300.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A ballast circuit for energizing a first lamp, comprising
an inverter circuit having a first switching element through which current to the first lamp flows;
a first control circuit coupled to the first switching element for alternately biasing the first switching element to conductive and non-conductive states at a duty cycle;
a duty cycle control circuit coupled between the first control circuit and the first switching element for decreasing the duty cycle of the first switching element when voltage to the first lamp increases above a predetermined threshold,
wherein the first switching element is the only actively biased switching element of said inverter circuit.

2. The ballast circuit according to claim 1, wherein the first switching element is the only actively biased switching element coupled to the first lamp.

3. The ballast circuit according to claim 1, wherein the first control circuit includes a current mode controller integrated circuit.

4. The ballast circuit according to claim 1, wherein the switching element is a FET.

5. The ballast circuit according to claim 1, wherein the first control circuit provides a first conduction control signal to the duty cycle control circuit, the first conduction control signal alternating between first and second signal levels, the first signal level corresponding to a conductive state for the first switching element and the second signal level corresponding to a non-conductive state for the first switching element, the first conduction control signal corresponding to a first duty cycle for the first switching element.

6. The ballast circuit according to claim 5, wherein the duty cycle control circuit provides a second conduction control signal to the first switching element, the second conduction control signal having a shape that substantially matches a shape of the first conduction control signal when the voltage at the first lamp is less than or equal to the predetermined threshold.

7. The ballast circuit according to claim 6, wherein a first signal level of the second conduction control signal, which corresponds to a conductive state for the first switching element, provides a lesser portion of the second conduction control signal as compared with the first signal level of the first conduction control signal.

8. The ballast circuit according to claim 1, wherein the first switching element, the first control circuit, and the duty cycle control circuit form a portion of a first inverter circuit which includes a resonant circuit having a resonant inductive element.

9. A ballast circuit for energizing a first lamp, comprising
a first switching element through which current to the first lamp flows;
a first control circuit coupled to the first switching element for alternately biasing the first switching element to conductive and non-conductive states at a duty cycle;
a duty cycle control circuit coupled between the first control circuit and the first switching element for decreasing the duty cycle of the first switching element when voltage to the first lamp increases above a predetermined threshold,
wherein the first switching element, the first control circuit, and the duty cycle control circuit form a portion of a first inverter circuit which includes a resonant circuit having a resonant inductive element and the duty cycle control circuit includes an inductive feedback element which is inductively coupled with resonant inductive element.

10. The ballast circuit according to claim 9, wherein a signal present on the feedback element is rectified.

11. The ballast circuit according to claim 10, further including a second switching element coupled to the first switching element for causing the first switching element to transition to a non-conductive state.

12. The ballast circuit according to claim 11, wherein the signal present on the feedback element is rectified by a base capacitor and the second switching element becomes conductive when a voltage level on the base capacitor is greater than a predetermined voltage level.

13. A ballast circuit for energizing a first lamp comprising:
a first switching element through which current to the first lamp flows;
a first control circuit coupled to the first switching element for alternately biasing the first switching element to conductive and non-conductive states at a duty cycle;
a duty cycle control circuit coupled between the first control circuit and the first switching element for decreasing the duty cycle of the first switching element when voltage to the first lamp increases above a predetermined threshold, said first switching element, said first control circuit, and said duty cycle control circuit forming a portion of a first inverter circuit which includes a resonant circuit having a resonant inductive element,
a second inverter circuit for energizing a second lamp, wherein the second lamp operates independently of the first lamp.

14. The ballast circuit according to claim 13, wherein the ballast is modular such that the first inverter forms at least a part of a first module.

15. The ballast circuit according to claim 14, wherein an integrated circuit provides a conduction control signal to the first inverter and to the further inverters.

16. The ballast circuit according to claim 1, wherein the duty cycle control circuit regulates the current to the first lamp to a predetermined current level.

17. The ballast circuit according to claim 16, wherein the first lamp has a first cross-sectional area.

18. The ballast circuit according to claim 17, wherein the lamp can vary in length.

19. A ballast circuit for energizing a first lamp, comprising
a first inverter circuit including:
a resonant circuit having a resonant inductive element and a resonant capacitive element;
a first switching element coupled to the resonant circuit for providing an AC signal to the first lamp;
a first control circuit coupled to the first switching element for controlling a conduction state of the first switching element, the control circuit including:
a conduction control circuit providing a first conduction control signal corresponding to a first duty cycle for the switching element, the first conduction control signal alternating between first and second voltage levels, the first voltage level corresponding to a conductive state for the first switching element and the second voltage level corresponding to a non-conductive state for the first switching element;
a duty cycle control circuit coupled between the conduction control circuit and the first switching element, the duty cycle control circuit receiving the first conduction control signal and providing a second conduction control signal to the first switching element, the second conduction control signal corresponding to a second duty cycle for the first switching element which is substantially the same as the first duty cycle when a voltage at the lamp is less than or equal to a predetermined level and is less than the first duty cycle when the voltage level at the lamp is greater than the predetermined level, wherein said first switching element is the only actively biased switching element of said first inverter.

20. The ballast circuit according to claim 19, wherein the conduction control circuit is provided as an integrated circuit.

21. The ballast circuit according to claim 19, wherein the duty cycle control circuit includes an inductive feedback element inductively coupled to the resonant inductive element.

22. The ballast circuit according to claim 21, wherein the duty cycle control circuit includes a base capacitor and a diode for rectifying a signal on the feedback element.

23. The ballast circuit according to claim 22, wherein the duty cycle control circuit includes a second switching element coupled to the first switching element for causing the first switching element to transition to a non-conductive state, the second switching element being biased to a conductive state when a voltage on the base capacitor becomes greater than a predetermined threshold.

24. The ballast circuit according to claim 23, wherein the resonant circuit, the first switching element, and the control circuit form a part of an inverter circuit for energizing the first lamp, the ballast circuit further including further inverter circuits for independently energizing further lamps.

25. The ballast circuit according to claim 24, wherein the conduction control circuit provides the first conduction control signal to further switching elements in the further inverters.

26. The ballast circuit according to claim 25, wherein the ballast circuit is modular such that the inverter corresponds to a first module and the further inverters correspond to further modules.

27. The ballast circuit according to claim 26, wherein the first inverter and each of the further inverters includes a single actively biased switching element for supplying current to a respective lamp.

28. The ballast circuit according to claim 19, wherein the duty cycle control circuit regulates the current to the first lamp to a predetermined current level, wherein the first lamp has a predetermined diameter and can vary in length.

29. A modular ballast circuit for independently energizing a plurality of lamps, comprising:

a first inverter for energizing a first one of the plurality of lamps, the first inverter including a first switching element having a conduction state controlled by a first control circuit, the first inverter including a first resonant circuit having a first resonant inductive element and a first resonant capacitive element for energizing the first one of the plurality of lamps, the first control circuit including:
an integrated circuit which provides a first conduction control signal; and
a first duty cycle control circuit receiving the first conduction control signal and providing a second conduction control signal to the first switching element; and a second inverter for energizing a second one of the plurality of lamps, the second inverter including a second switching element having a conduction state controlled by a second control circuit, the second inverter including a second resonant circuit having a second resonant inductive element and a second resonant capacitive element for energizing the second one of the plurality of lamps, the second control circuit including:
a second duty cycle control circuit receiving the first conduction control signal and providing a third conduction control signal to the second switching element, wherein a first replaceable module corresponds to the first duty cycle control circuit and a second replaceable module corresponds to the second duty cycle control circuit.

30. The ballast circuit according to claim 29, wherein the first conduction control signal corresponds to a first duty cycle for the first and second switching elements, the second conduction control signal controlling the first switching element at the first duty cycle when a voltage at the lamp is less than or equal to a first predetermined threshold and at a second duty cycle, which is less than the first duty cycle, when the voltage at the first lamp is greater than the first predetermined threshold, and the third conduction control signal controlling the second switching element at the first duty cycle when the a voltage at the second lamp is less than or equal to a second predetermined threshold and at a third duty cycle, which is less than the first duty cycle, when the voltage at the second lamp is greater than the second predetermined threshold.

31. The ballast circuit according to claim 30, wherein the first duty cycle control circuit includes a first inductive feedback element inductively coupled with the first resonant inductive element and a first base capacitor coupled to the first switching element, wherein a signal on the feedback element charges the first base capacitor to a voltage level, the first switching element transitioning to a conductive state when the voltage on the first base capacitor is greater than a predetermined threshold.

* * * * *